United States Patent
Klevenz et al.

(10) Patent No.: US 7,657,609 B2
(45) Date of Patent: Feb. 2, 2010

(54) DATA TRANSFER IN A MULTI-ENVIRONMENT DOCUMENT MANAGEMENT SYSTEM ACCESS

(75) Inventors: Stephan Klevenz, Heidelberg (DE); Vedran Lerenc, Heidelberg (DE); Nicolai Jordt, Bad Schoenborn (DE); Martin Hermes, Muehlhausen-Rettigheim (DE)

(73) Assignee: SAP AG, Walldorf (DE)

( * ) Notice: Subject to any disclaimer, the term of this patent is extended or adjusted under 35 U.S.C. 154(b) by 754 days.

(21) Appl. No.: 11/175,557

(22) Filed: Jul. 5, 2005

(65) Prior Publication Data

US 2007/0011274 A1    Jan. 11, 2007

(51) Int. Cl.
    *G06F 15/16*    (2006.01)
(52) U.S. Cl. .............. 709/218; 709/203; 709/212; 709/232; 709/217; 709/219; 719/328
(58) Field of Classification Search ........... 709/217, 709/218, 219; 719/328, 315
    See application file for complete search history.

(56) References Cited

U.S. PATENT DOCUMENTS

| | | | |
|---|---|---|---|
| 6,904,014 B1* | 6/2005 | Gai et al. ............... | 370/230.1 |
| 7,231,455 B2* | 6/2007 | Marejka et al. .......... | 709/233 |
| 2004/0187083 A1* | 9/2004 | Tracey et al. .......... | 715/532 |
| 2006/0123479 A1* | 6/2006 | Kumar et al. .......... | 726/23 |
| 2006/0133278 A1* | 6/2006 | Hill et al. .............. | 370/235 |

OTHER PUBLICATIONS

Joshua Bloch, How to Design Good APIs and Why They Matter[online], Mar. 31, 2004[retrieved on Sep. 24, 2008].Smalltalk Tidbits, Industry Rants, p. 2. Retrieved from the Internet: http://www.cincomsmalltalk.com/blog/blogView?showComments=true&entry=3258158706.*
Microsoft Press Computer Dictionary, Second Edition, 1994, p. 24.*

* cited by examiner

*Primary Examiner*—William C Vaughn, Jr.
*Assistant Examiner*—Farrukh Hussain
(74) *Attorney, Agent, or Firm*—Kenyon & Kenyon LLP

(57) ABSTRACT

A system and method for accessing a document management system in a multi-environment processing system includes receiving a client call command from a web service proxy. The web service proxy, disposed on a client and running in conjunction with a client application. A web service end point, disposed in a web service framework receives the client call command. Through the web service end point and a class module, the client call command is converted for accessing the document management system. Retrieved data is temporarily stored in a memory location. The amount of data transfer allowed in a single data transfer is determined. Then, based on this information, multiple web services call are executed to incrementally transfer the data for the client application.

16 Claims, 7 Drawing Sheets

DATA TRANSFER IN A MULTI-ENVIRONMENT DOCUMENT MANAGEMENT SYSTEM ACCESS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to remote application data access and more specifically to accessing data and the transferring of the data from a document management system across various processing platforms.

In existing systems, problems arise between different software platforms and different applications running on these platforms. In addition to problems associated with the executable instructions, there is also compatibility issues regarding data objects used across multiple platforms. For example, if a general application is used to collect data and a specialized application uses the data, problems can arise in accessing the data. Data access and/or retrieval commands may only be readable by the first software platform, causing problems with the second platform.

As the number of remote applications increase, there is a greater demand for usability of these applications across a centralized system. For example, if a processing system includes applications and other executable clients in different platforms, e.g. JAVA, C++, ABAP, or other languages, these systems cannot communicate without one or more translators. This translation is not only computationally expensive, but also can be problematic with advancements in the different systems.

One approach for overcoming problems associated with varying platform applications is a web services architecture. The web services architecture generally describes functionality allowing for communication across different applications in different platforms through a centralized communication protocol.

Web services associated with a central application for document management is problematic when accessing complex applications, such as found with applications associated with centralized document management.

In a document management system it is often required to transfer content of a document, which might have a size of hundreds of megabytes. One problem currently existing is that web services only provide for the transfer of data in a serialized fashion. This data is serially transmitted across a network. For example, in a pure JAVA environment, streaming is used to transfer large data content. Streaming is not supported by the web service technology. Sending the whole content in one web service call is also not possible because the server or client will run out of memory.

This serial transfer works with small amounts of data. Web services are typically accessed by a web service proxy and the serialization of data transfer is therefore visible to a client application. With the larger data transfer of the document management system, this client-level visibility can create significant inconveniences for APIs on client applications while accommodating the serial data transfer.

Similarly, web services typically do not distinguish between remote data calls and local data calls. Remote data calls require further processing due to call translations and other factors. In some applications, this process is unnecessary, if the client application and web service end-point are running on the same platform. Typically, the decision if the applications runs on the same server, is often not even done by a user interface developer but depends on the usage at customer side.

For example, if a JAVA-based user interface is built on a document management framework, the user interface can run either on the same platform as the management framework, which may be called a local Scenario, or on a remote platform which is called a Remote Scenario. The user interface developer can either always use the web service API, which is costly in terms of performance with the Local Scenario, or has to distinguish between the Remote and Local Scenario and use two different APIs.

Another problem that arises with web service features is the synchronization of the APIs. A web service API executes on top of an existing API, such as the API for the document management system. Therefore, these two API must be synchronized for efficient and effective operation.

Similarly, in existing systems, if the web service API is enhanced by new features, all client proxies need to be updated to fit to the new web service. As it is difficult to maintain updated proxies, a document management system typically has to support multiple versions of the web service. This increases the size of the web service API and has a direct effect on a total cost of ownership for developing the underlying web services.

DETAILED DESCRIPTION

In a multi-environment system, data object management may be across multiple environment or processing platforms. Data objects are stored on a central management system. Using interfaces for communication across the different platforms, the data objects may be accessed from any of the facilitated platforms. Thereupon, client software applications accessing the data object management device may be executed on a processing environment that is different from the management system processing environment. As such, the management system is independent of client application platforms and allows for document access from any client application or client application processing environment capable of interfacing with the management system.

Figure 1:
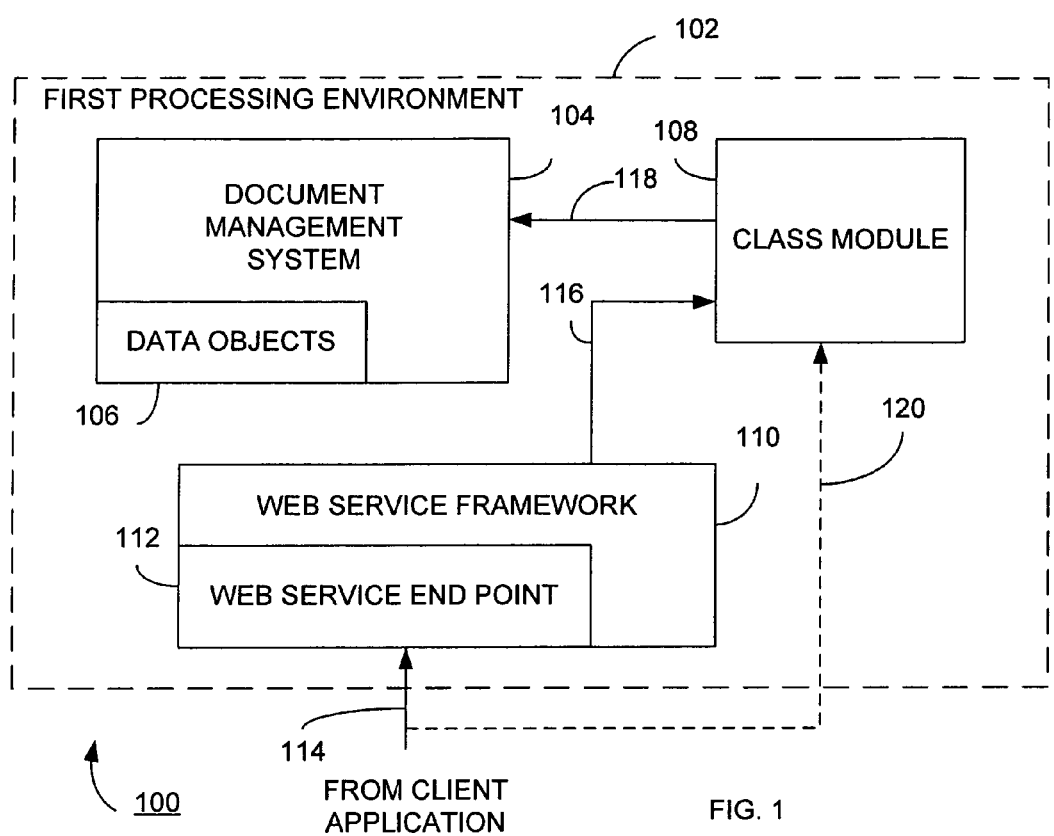
FIG. 1 is a block diagram of one embodiment of an apparatus for a multi-environment document management access.

FIG. 1 illustrates an apparatus 100 in a first processing environment 102. In the apparatus 100 is a document management system 104 having data objects 106 stored therein. The apparatus 100 further includes a class module 108 and a web service framework 110 having a web service end point 112 therein. In one embodiment, the class module may be a module providing for translation, such as directed to an Enterprise Java Bean (EJB) class, or any suitable class.

The management system 104 is a repository framework module that provides for access to data objects 106. The data objects 106 may be stored in the system 104 or may be readily accessible by the system 104, such as in one or more coupled databases (not shown). The data objects 106 may be any data object that may be centrally stored and accessed by an application.

The web service end point 112 is a module implemented in software, running on the first processing environment 102. The web service end point 112 provides for the execution of document requests that are directed to the management system 104. The web service end point 112 may include multiple classes for translating the incoming data commands, as discussed in further detail below. In one embodiment, the first processing environment 102 may be a JAVA-based processing environment and the web service end point 112 may be implemented as an EJB, for use with the EJB class(es) in the class module 108.

The web service framework 110 may be an Enterprise Service Protocol (ESP) module allowing for the communication between the web service end point 108 and a client application (not shown).

The web service end point 112 receives a call command 114 from a client application. The client application is executed on a second processing environment, which may be different from the first processing environment. Typically, the call command 114 is received across a network providing for communication between the two processing environments. The call command 114 may also come across a local communication channel if the client application is local to the first processing environment 102.

As discussed in further detail below, the web service end point 112 receives the client command 114 and through the framework 110, provides a serialized request 116 to the class module 108. The module 108, using a complex type class structure, as discussed with below, converts the request 116 into a data access command 118. The document management system 104 receives the command 118 and thereupon accesses the data objects 106.

FIG. 1 also illustrates another embodiment where a client command 120 is received directly from a client application. Where the client application is being executed on a processing environment that is the same of the first processing environment, the web service framework 110 may be bypassed. Since client command 120 does not need to be translated by the end point 112, the system may bypass the framework 110 entirely.

Figure 2:
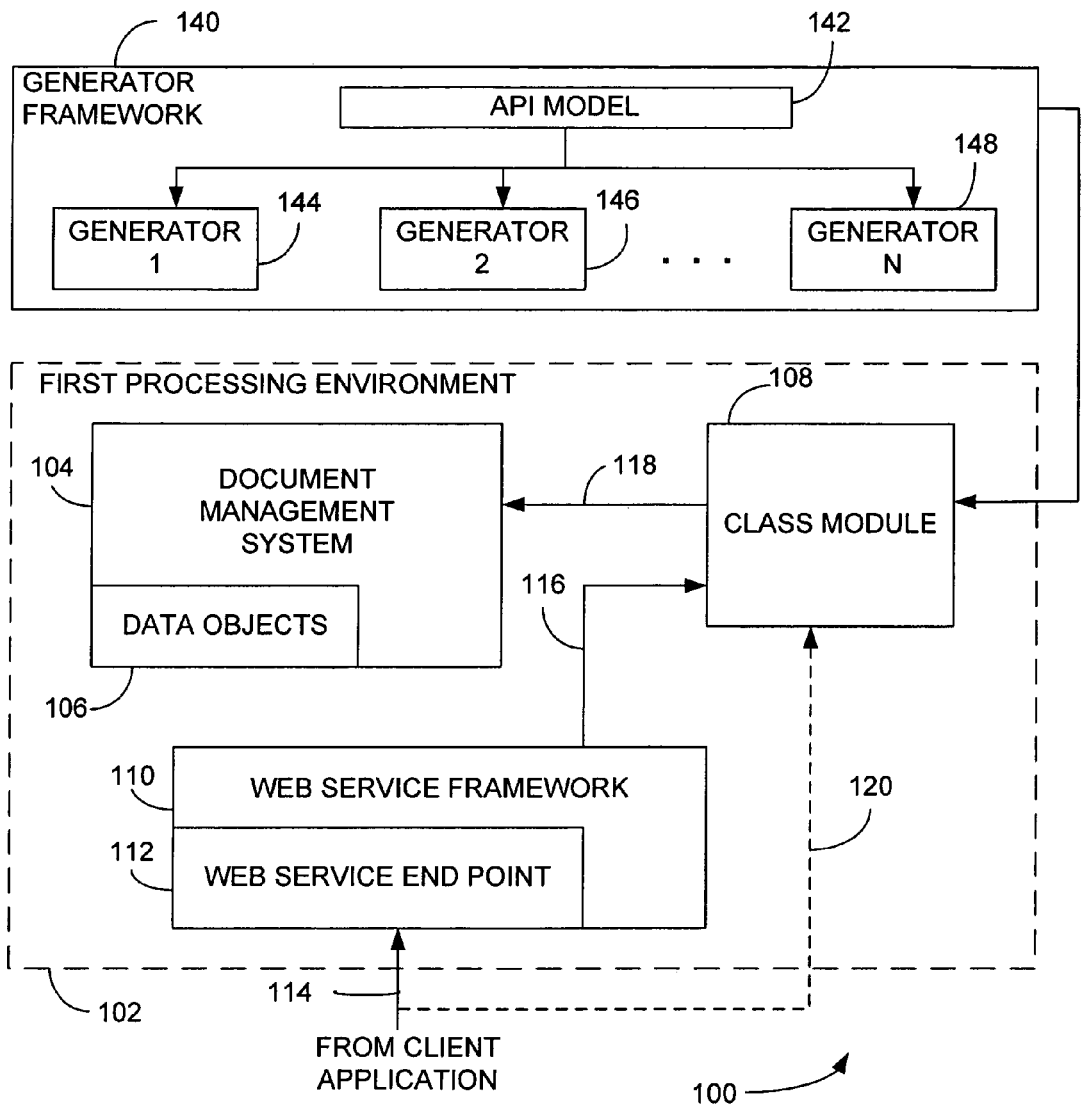
FIG. 2 is a block diagram of another embodiment of an apparatus for multi-environment document management access.

FIG. 2 illustrates the system 100 of FIG. 1 including a generator framework 140. The generator framework 140 generates complex type class structures. The generator framework 140 include an API model 142 which is a database or other storage element including information about different API levels.

The generator framework 140 also includes a first generator 144, second generator 146 and an nth generator 148. As illustrated, any suitable number of generators may be included in the framework 140. Each generator 144, 146 and 148 is directed to a particular programming environment. For example, the generators may be API generators relating to EJB, JAVA, ABAP, C++ or any other processing environment. These generators 144, 146 and 148 generate the data structures for the corresponding programming language or processing environment that are included in the first processing environment.

Illustrated in FIG. 2, in a run time environment, the generator framework 140 may generate the class structures usable by a client module (not shown). As discussed in further detail below, the generator framework may also be used for the generation of client-side programming functionality relating to various processing environments, including the class structure.

Figure 3:
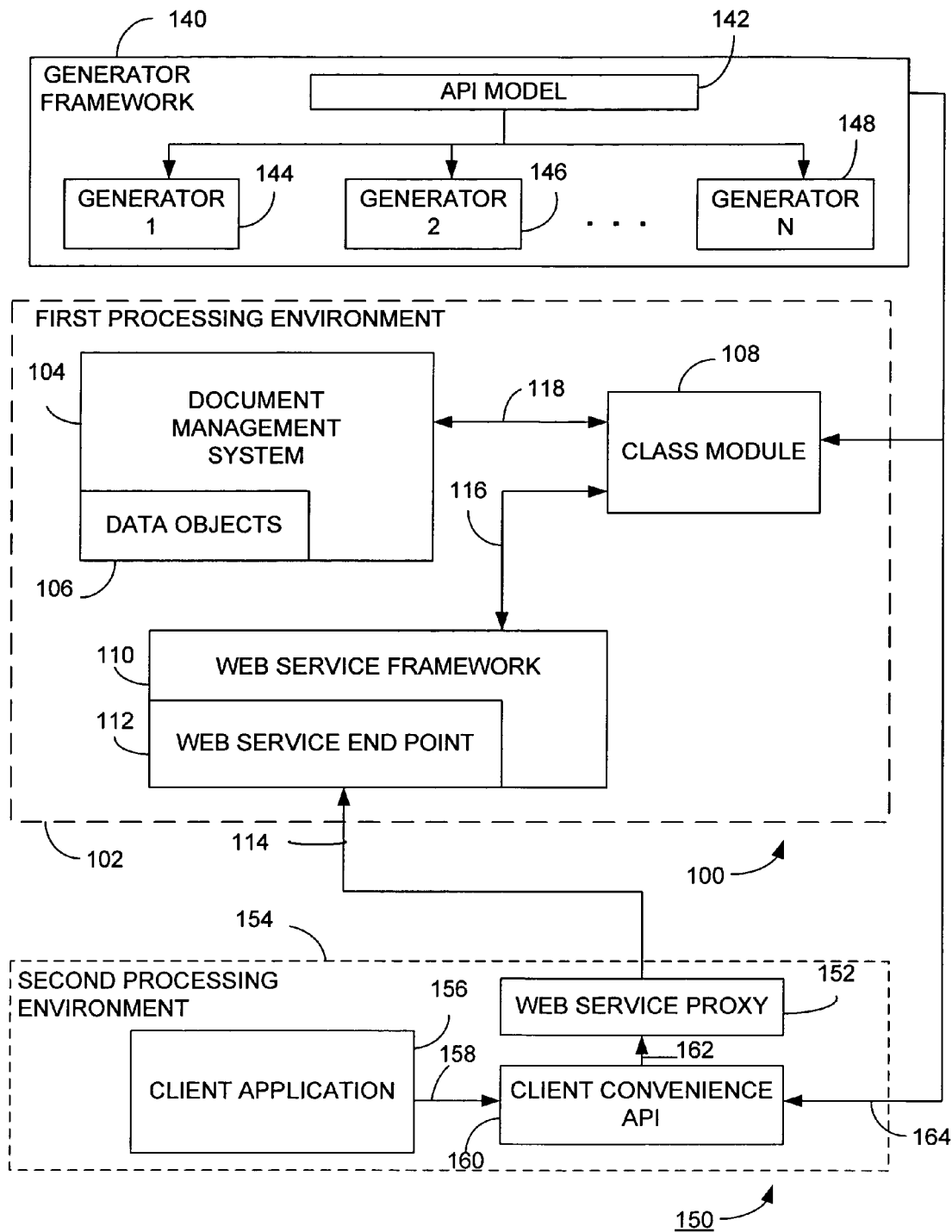
FIG. 3 is a block diagram of another embodiment of a system for multi-environment document management access.

FIG. 3 illustrates one embodiment of a system 150 for multi-environment document management access. The system 150 includes the apparatus 100 and the generator framework 140. In the system 150, the client call command 114 is received by the web service end point 112 from a web service proxy 152. In a second processing environment 154, a client application 156 generates a document request 158, which is provided to a client convenience API 160. The API 160 translates the command 158 to generate a translated command 162, converting the objects into data structures. The command 162 is then provided to the web service proxy 152.

Illustrated in FIG. 3, the client convenience API 160 is populated by the generator framework 140. Information stored in the API model 142 includes web service API and client convenience API data 164. The generator framework 140 generates during run time the translation information for both ends of the process through which the document management system 104 receives the client call commands 114. The translated request 162 is converted by the client convenience API 160 using a complex type class. The complex type class is a usable for translating data objects into corresponding structures and vice versa.

Through the usage of the API model 142 in the generator framework 140, the second processing environment 154 may be any environment having a corresponding generator 144, 146 or 148. As further developments of the processing environments occur, variations in the generators may be made, without having to modify the web service end point 112 or the web service framework 110. Rather, updates may be reflected in the API model 142.

Figure 4:
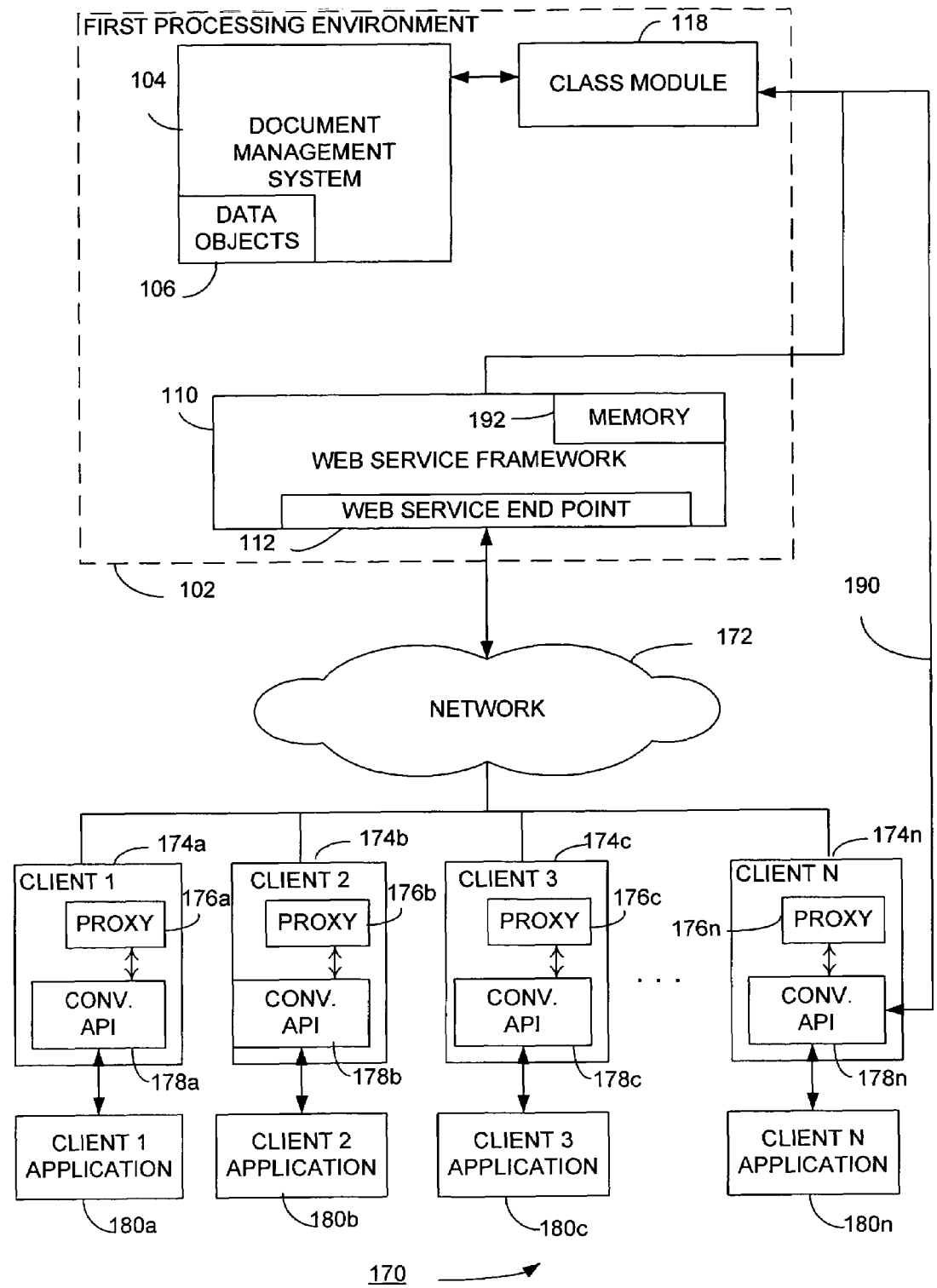
FIG. 4 is a block diagram of another embodiment of a system for multi-environment document management access.

FIG. 4 illustrates another embodiment of a system 170 for multi-environment document management access. In the first processing environment 102 is the document management system 104 having data objects 106 stored therein. The class module 108 is in communication with the management system 108. Within the first processing environment 104 is web service framework 110 and the web service end point 112.

Illustrated in FIG. 4, the web service end point 112 is coupled to a network 172 for data communication thereacross. Also coupled to the network 172 is N number of clients 174a through 174n. Each of these clients 174 include a web service proxy 176 and client convenience API 178, similar to FIG. 3. Also, each of the clients 174 is coupled to a client application 180 that executes a corresponding application in a resident processing environment.

In FIG. 4, the different clients 174 and applications 180 represent any number of different processing environments. While each of these applications 180 may be on different platforms or processing environments, they may each access the document management system 104 in the first processing environment 102.

While FIG. 4 does not include the generator framework 140 of FIG. 3, it is recognized that in one embodiment, the client convenience API 178 is generated by the generator framework. Similarly, the generator framework may also generate a web service API that is usable by the proxy 176 for interfacing with the web service end point 112 across the network 172.

Also illustrated in FIG. 4 is a memory device 192 in the web service repository framework 110. This memory device may be disposed at any suitable location such that it may be accessed by the web service end point 112 for the management of data transfer between the end point 112 and the web service proxy 176.

Due to the size limitations of data transfer, often times it is difficult to transfer all the documents or client call commands in a single routine. As cross-network communication can be a costly overhead in processing speed and time, the convenience API 178 and the web service end point 112 include features providing for the efficient transfer of data between the different processing environments.

In one embodiment, the client application 180 may include functionality for determining which aspects of a resource or document are to be utilized. For example, a document may have different elements, such as a system properties, customized properties, content, content metadata and access URLS. The client application 180 may not be interested in all parts of the document. The client application 180 decides which parts of the document should be retrieved. Therefore, in one embodiment, the client call command includes an identifier of the particular parts of the document to be retrieved.

In another embodiment, the memory device 192 allows the web service framework 110 to transfer data in defined chunks. A data transfer size is first determined. In one embodiment, a call command may be generated by the client application 180. When the call command is received by the web service end point 112, a token is generated, where the token provides for a time for data transfer. Using this call command, the size of the content chunks, the data transfer size, and the life time of the token are determined.

In one embodiment, the web service framework 110 executes multiple web service calls to incrementally transfer the data from the memory device 192. The size of the transfer units is controlled based on the data transfer size. Typically, these web service calls are generated by the web service proxy 176. Using a data chunking technique in conjunction with the web service proxy allows for the efficient transfer of data across the network 174. Furthermore, the data chunking operations may be controlled on the client 174 through the convenience API 176. As such, the data chunking operations are transparent to the client application 180.

Figure 5:
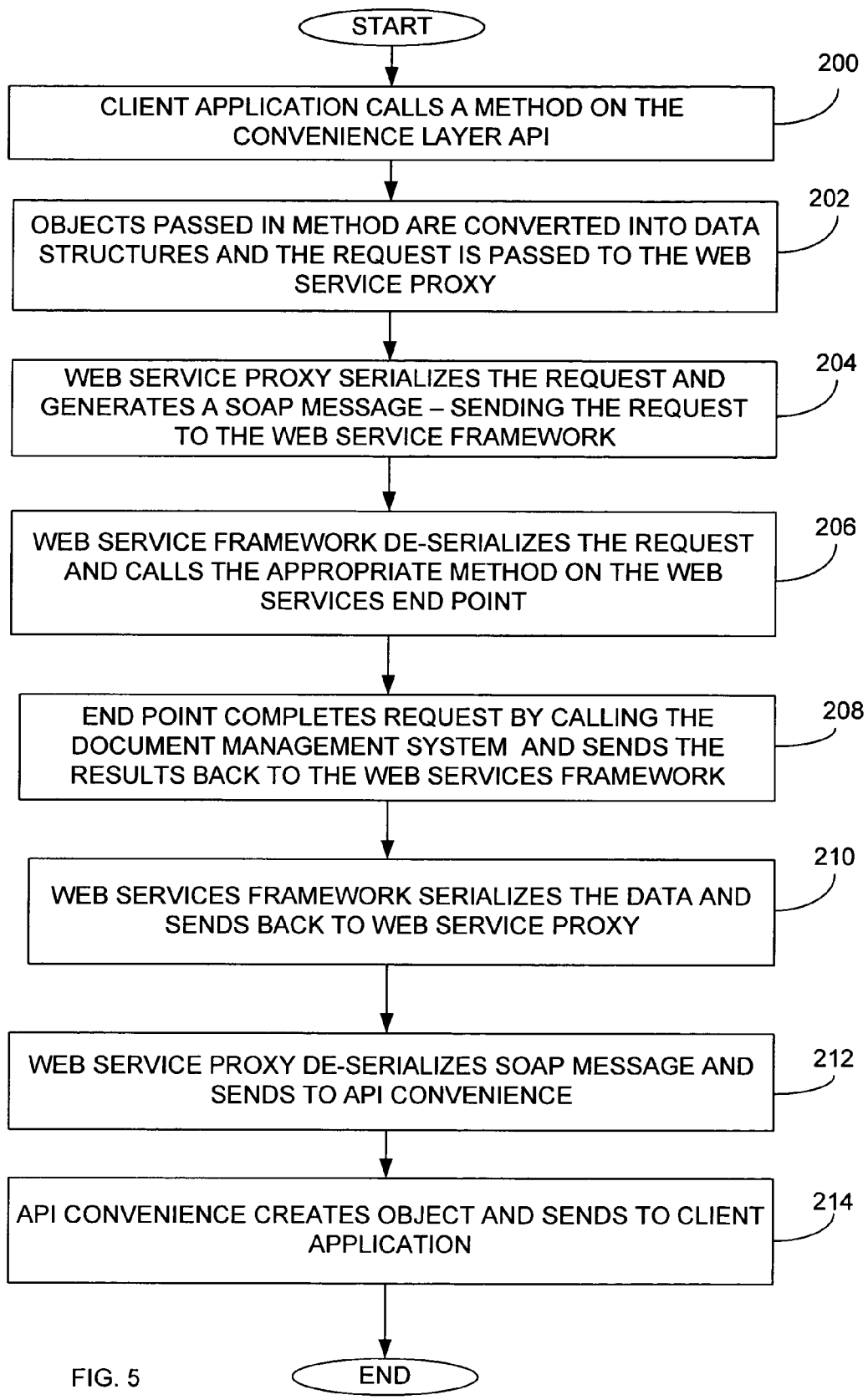
FIG. 5 is a flowchart of the steps of a remote document management access.

FIG. 5 illustrates the steps of one embodiment of a method for accessing the document management system. In this embodiment, the client application is on a different processing environment than the document management system. As described with reference to FIG. 4, the first step, step 200, is the client application 180 calls a method on the convenience layer API 178, where the method call includes one or more data objects. The next step, step 202, is that the objects passed in the method are converted into data structures and the request is passed to the web service proxy within the client.

As the convenience API transfers data structures into real objects, the interfaces of these objects may be defined by the API model in the generator framework 140. In one embodiment, a Complex Type factory may be used to define specific implementations of these interfaces. Which implementations to be used may be determined by the Complex Type factory during a run time. As an example, the convenience API may deal with an interface of type IResource. A specific implementation of IResource might be a Document, a Folder or a Link. A complex type factory may be used during runtime to determine the real object which has to be instantiated by the convenience API. If an application calls a method, for example, getchildren( ) on the convenience API, it will get a list of IResources, but the concrete implementation of the interface are Documents, Links and Folders. The Complex Type factory may be changed by the application during runtime by a registration mechanism. So if an application deals always with, for example, CAD drawings, it can supply its own implementation for a CAD drawing which enhances the features of an IResource and register a Complex Type factory which creates these CAD drawings.

The next step, step 204, is that the web service proxy serializes the request and generates a message, such as a SOAP message, sending the request to the web service repository framework 110 across the network 172.

The web service repository framework 110 de-serializes the request and calls the appropriate method on the web services end point 112, step 206. The web service end point 112 completes the request by calling the document management system 104 through the class module 108 and sends the results back to the web services framework 110, step 208.

The next step, step 210, the web services framework de-serializes the SOAP message and sends the message to the web service proxy 176, across the network 172. The next step, step 212, the proxy 176 de-serializes the SOAP message and sends the message to the convenience API 178. Thereupon, the convenience API creates an object and sends the object to the client application, step 214. Step 214 may be performed using the data chunking technique described below. As such, the method of a remote access is complete.

Figure 6:
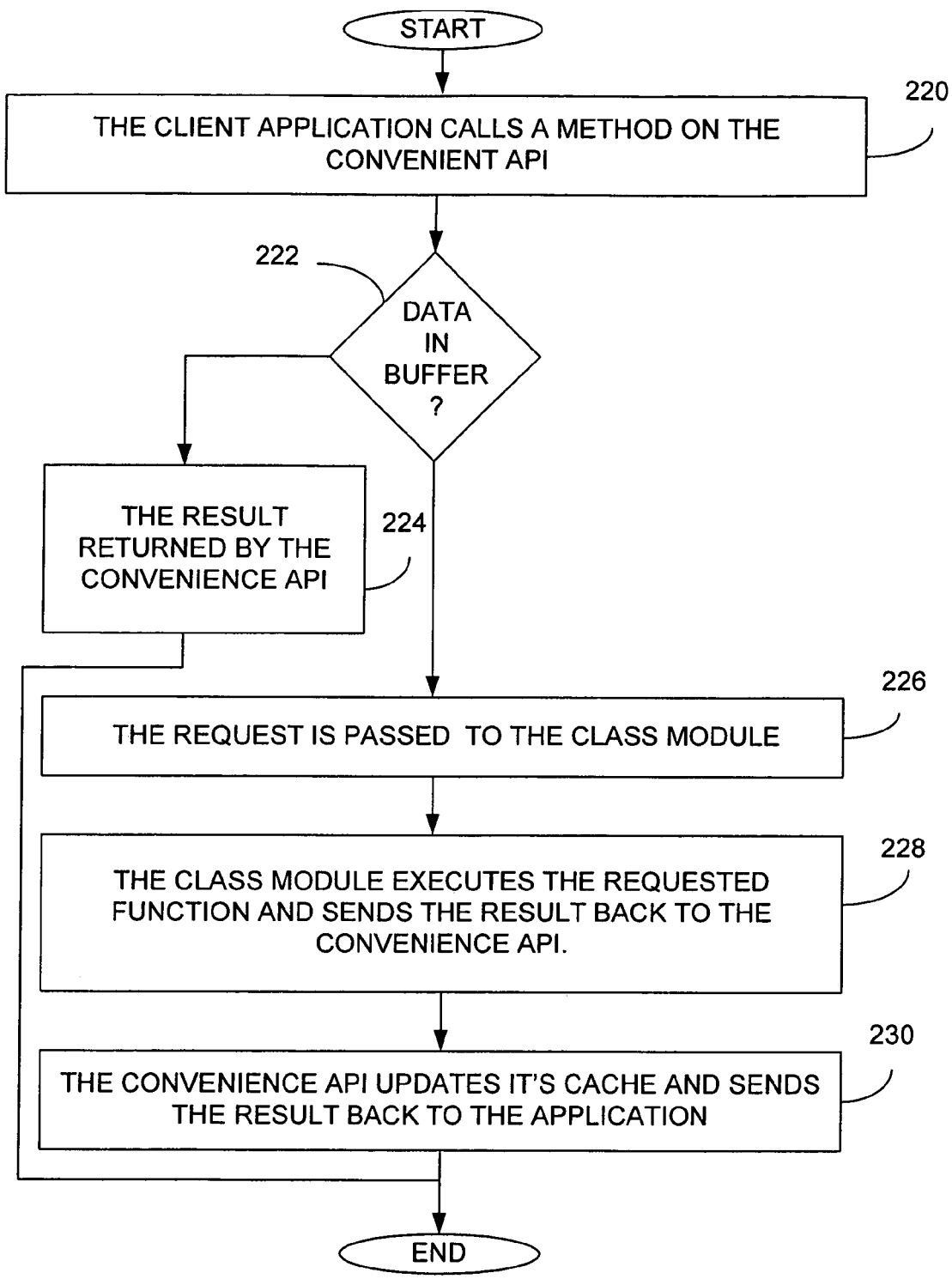
FIG. 6 is a flowchart of the steps of a local document management access.

FIG. 6 illustrates the steps of another embodiment of accessing the document management system. The method is directed to a local access embodiment where the client application and the document management system are on the same processing environment. The method begins, step 220, when the client application 180 calls a method on the convenience API 178. Across a local connection, such as connection 190 of FIG. 4, the convenience API 178 is in direct communication with the web service end point 108.

In this embodiment, a determination is made if the data sought by the method call is already disposed in a data buffer. If the data is stored in the buffer, the call to the document management system 104 unnecessary, therefore the method proceeds to step 224 where the results are returned to the client application 180 by the convenience API 178. Although, if the data is not in the buffer, the method proceeds to step 226 which is that the request is passed to the class module 108. This request is passed across the local connection 190.

The next step, step 228, is that the class module 108 executes the requested function and sends the results back to the convenience API 178. The convenience API updates a local cache and sends the results back to the application 180. Thereupon, in this embodiment, since the client and the document management system are in the same processing environment, the web service end point 112 and framework 110 may be avoided. Through a recognition of common processing environments, overhead associated with conversion of the client call commands may be reduced.

Figure 7:
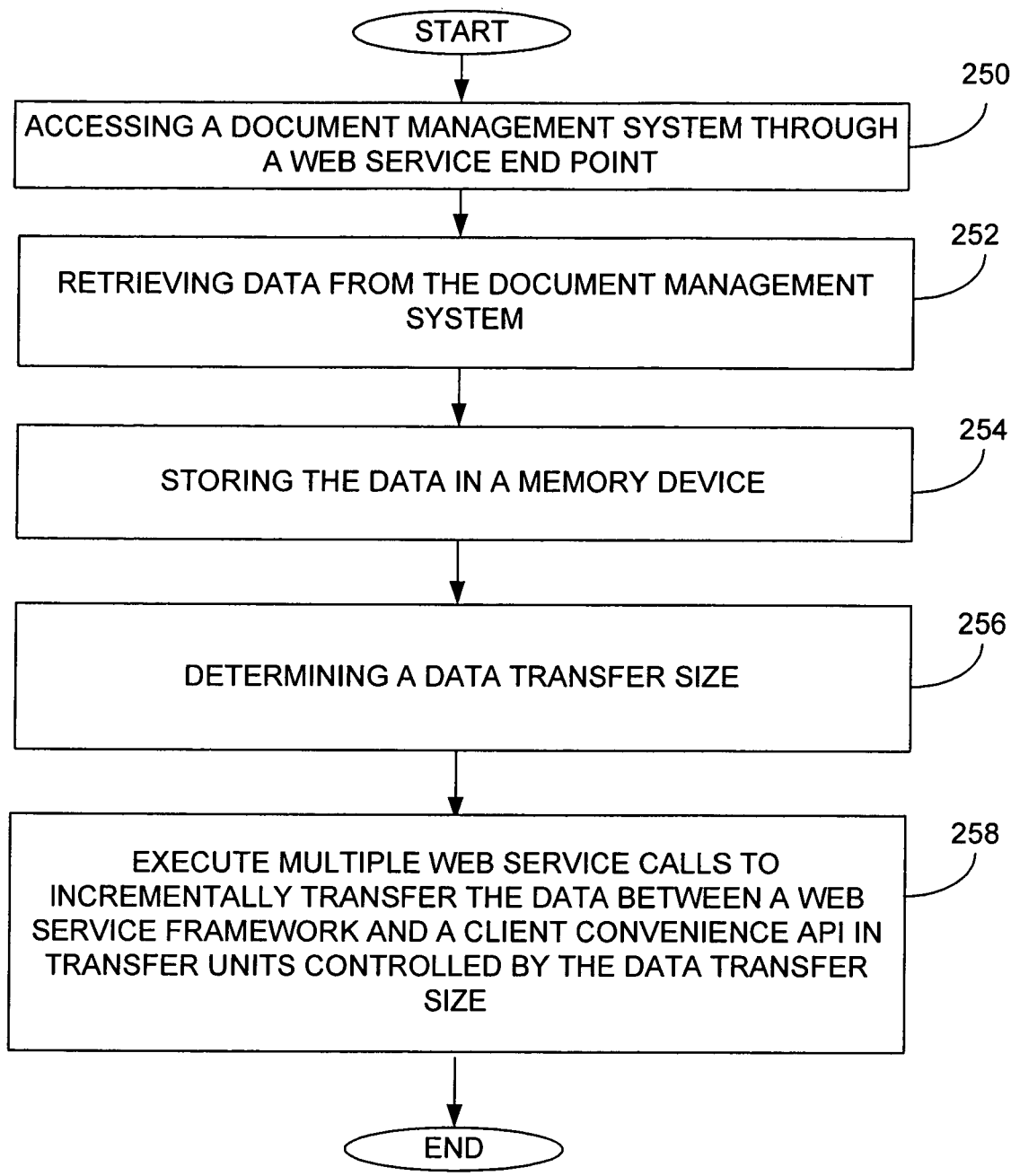
FIG. 7 is a flowchart of the steps of a method for data transfer across a multi-system environment.

FIG. 7 illustrates the steps of one embodiment of a method for data transfer in the multi-processing environment. The method begins by accessing a document management system through a web service end point, step 250. In one embodiment, the web service end point 108 may be used to access the document management system 104 on the first processing environment.

The next step, step 252, is retrieving data from the document management system, such as the system 104. This document retrieval may be in accordance with embodiments described above. The next step, step 254, is storing the data in a memory device. This memory device (192 of FIG. 5) may be disposed within or associated with the web service framework.

The next step is to determine a data transfer size, step 256. As discussed above, this may be determined based on a client call command from a client application. This data transfer size provides for the amount of data that can be transferred in a single data call. Thereupon, the final step of this embodiment is executing multiple web service calls to incrementally transfer the data between a web service framework and a client convenience API in transfer units controlled by the data transfer size, step 258. Thereupon, the data is transfer in a data chunking format. In one embodiment, the data chunking is performed between the web service end point 112 and the web service proxy 176, therefore the data transfer technique is unknown to the client application 180. Therefore, where existing systems use streaming techniques to communicate therebetween, the above method provides for full data transfer of data files that previously exceed the data transfer limits in a serial data transfer environment.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exists implementations of other variations and modifications of the invention and its various aspects, as may be readily apparent to those of ordinary skill in the art, and that the invention is not limited by specific embodiments described herein. For example, the sales information may contain varying data fields for varying types of items, such as tiered pricing structures, special order items, currency conversion fields, conditional sales fields or any other type of data structure allowing for collaboration of sales. It is therefore contemplated to cover any and all modifications, variations or equivalents that fall within the scope of the basic underlying principles disclosed and claimed herein.

What is claimed is:

1. A system for transferring data objects across multi-environments, comprising:
    a first device in a first processing environment including:
        a document system, the document system having a memory device to store a plurality of data objects stored therein; and
        a web service framework including a web service end point disposed in the first processing environment;
    a second device in a second processing environment, wherein the second device is coupled to the first device via a communication network, the second processing environment including:
        a client application;
        a client convenience API coupled to the client application; and
        a client proxy coupled to the client convenience API,
    wherein the web service end point of the first device is adapted to:
        responsive to receiving a call command generated from the client application for retrieving data from the document system, the client call including which elements of the data to be retrieved,
        store the data in the memory device, wherein the memory device allows the web service framework to transfer the data in defined chunks;
        determine a data transfer size; and
        generate a token, the token including parameter data of a time at which the data transfer between the web service end point and the client proxy will occur, the data transfer size, and a lifetime of the token;
    at the time of data transfer, execute multiple web service calls to incrementally transfer the elements of the data directly between the web service framework and the client proxy, each web service call transferring an incremental amount of data of the data transfer size,
    wherein the web service calls are transparent to the client application, and
    wherein the client proxy controls data chunking through the client convenience API.

2. The system of claim 1, wherein the lifetime of the token is determined based on at least one of the user's command, a data object size, and the transfer data size between the web service end point and the client proxy.

3. The system of claim 1, wherein the client command includes information relating to which parts of the documents are to be transferred from the web service framework to the client proxy.

4. A method for transferring data objects among multi-environments, comprising:
    responsive to a client call command from a client application in a second environment, the second environment including the client application, a client convenience API coupled to the client application, and a client proxy coupled to the client convenience API, the client call including which elements of the data to be retrieved, accessing a document management system through a web services end point disposed in a web service framework of a first environment;
    retrieving data from the document management system;
    storing the data in a memory device, wherein the memory device allows the web service framework to transfer the data in defined chunks;
    determining a data transfer size;
    generating a token including parameter data of a time at which the data transfer between the web service end point and the client proxy will occur, the data transfer size, and a lifetime of the token; and
    at the time of data transfer, executing multiple web service calls to incrementally transfer the elements of the data directly between the web service framework and the one of the plurality of clients, each web service call transferring an incremental amount of data of the data transfer size,
    wherein the web service calls are transparent to the client application, and
    wherein the client proxy controls data chunking through the client convenience API.

5. The method of claim 4, wherein the data are incrementally transferred across a network.

6. The method of claim 4, wherein the document management system has a plurality of data objects stored therein.

7. The method of claim 6, further comprising:
    receiving the client call command from a web proxy disposed in one of the plurality of clients.

8. The method of claim 7, further comprising:
    determining which parts of the data are to be received by the client proxy; and indicating in the client call command which parts of the documents are to be transferred from the web service framework to the client proxy.

9. The method of claim 4, wherein a lifetime of the token is determined based on at least one of the user's command, a data object size, and the transfer data size between the web service end point and the one of the plurality of clients.

10. The method of claim 4 wherein the data transfer is responsive to a plurality of client call commands.

11. The system of claim 1, wherein the web service end point is adapted to include a plurality of classes for translating commands from a plurality of clients to the document system.

12. The system of claim 11, wherein each of the plurality of clients is in one of a plurality of environments and includes:
 a web proxy communicatively connected to the web service end point; and
 a client API coupled to a client application from which a user issues a command for at least one data object.

13. The system of claim 12, wherein the client API in one of the plurality of environments and the plurality of classes in the web service end point in the first environment are both capable of being configured by a generator framework at runtime, the generator framework being in an environment independent of the first environment or any one of the plurality of environments.

14. The method of claim 4, wherein the web service end point is adapted to include a plurality of classes for translating commands from a plurality of clients to the document system.

15. The method of claim 14, wherein each of the plurality of clients is in one of a plurality of environments and includes:
 a web proxy communicatively connected to the web service end point; and
 a client API coupled to a client application from which a user issues a command for at least one data object.

16. The method of claim 15, wherein the client API in one of the plurality of environments and the plurality of classes in the web service end point in the first environment are both capable of being configured by a generator framework at runtime, the generator framework being in an environment independent of the first environment or any one of the plurality of environments.

* * * * *

UNITED STATES PATENT AND TRADEMARK OFFICE
CERTIFICATE OF CORRECTION

PATENT NO. : 7,657,609 B2 Page 1 of 1
APPLICATION NO. : 11/175557
DATED : February 2, 2010
INVENTOR(S) : Klevenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1059 days.

Signed and Sealed this

Twenty-eighth Day of December, 2010

David J. Kappos
*Director of the United States Patent and Trademark Office*